United States Patent
Suzuki et al.

(10) Patent No.: US 6,580,483 B2
(45) Date of Patent: Jun. 17, 2003

(54) REFLECTION-TYPE LIQUID CRYSTAL DISPLAY DEVICE

(75) Inventors: Shinichiro Suzuki, Yokohama (JP); Shinichi Komatsu, Yokohama (JP); Suzushi Nishimura, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/029,577

(22) Filed: Dec. 21, 2001

(65) Prior Publication Data

US 2002/0075431 A1 Jun. 20, 2002

Related U.S. Application Data

(63) Continuation of application No. PCT/JP00/04055, filed on Jun. 21, 2000.

(30) Foreign Application Priority Data

Jun. 22, 1999 (JP) ............................................. 11-175710
Jun. 22, 1999 (JP) ............................................. 11-175740

(51) Int. Cl.$^7$ ............................................. G02F 1/1335
(52) U.S. Cl. ....................................... 349/115; 349/112
(58) Field of Search ............................. 349/64, 106, 113, 349/105, 115, 98

(56) References Cited

U.S. PATENT DOCUMENTS

| | | | | |
|---|---|---|---|---|
| 6,177,216 B1 | * | 1/2001 | Broer et al. ................. | 349/106 |
| 6,184,949 B1 | * | 2/2001 | Cornelissen et al. ........ | 349/106 |
| 6,483,563 B2 | * | 11/2002 | Khan et al. .................. | 349/115 |
| 2001/0040653 A1 | * | 11/2001 | Faris ........................... | 349/98 |

FOREIGN PATENT DOCUMENTS

| | | |
|---|---|---|
| JP | 59-98417 U | 7/1984 |
| JP | 8-313899 A | 11/1996 |
| JP | 11-64842 A | 3/1999 |
| JP | 11-153789 A | 6/1999 |

* cited by examiner

*Primary Examiner*—Toan Ton
*Assistant Examiner*—P. R. Akkapeddi
(74) *Attorney, Agent, or Firm*—Akin, Gump, Strauss, Hauer & Feld, L.L.P.

(57) ABSTRACT

A reflection liquid crystal display device comprising a liquid crystal cell where a liquid crystal layer is provided between two opposed electrode substrates, a reflecting layer, and a cholesteric liquid crystal film, characterized in that the ratio (SCE/SCI) of the specular component excluded-refelctance (SCE) to the specular component included-reflectance (SCI) of the cholesteric liquid crystal film is 15% or more, the wavelenght bandwidth of the cholesteric selective reflection ranges from 30 mm to 150 nm, and the center wavelength of the cholesteric selective reflection is in the visible range of 380–780 nm or in the near-infared range of 800–2000 nm.

6 Claims, No Drawings

REFLECTION-TYPE LIQUID CRYSTAL DISPLAY DEVICE

CROSS-REFERENCE TO RELATED APPLICATIONS

The application is continuation of International Application No. PCT/JP00/04055 filed Jun. 21, 2000, the disclosure of which is incorporated herein.

BACKGROUND OF THE INVENTION

This invention relates to reflection-type liquid crystal display devices, and provides those which are made bright and highly visible by arranging therein a cholesteric liquid crystal film having specific optical parameters.

Liquid crystal displays have widened the range of their practical application from displays for pocket- or desk-top-calculators to those for word processors and personal computers, due to their remarkably improved displaying performance. Furthermore, the liquid crystal displays have been expected to widen their markets as displays for portable information terminal devices where the displays can make the best use of their peculiar characteristics, i.e., thin in size and light in weight. When used for portable devices, the liquid crystal displays are usually battery-driven and thus are required to reduce the electricity consumption. Therefore, reflection-type liquid crystal displays, which can dispense with an electricity-consuming back light, particularly those having a reflection plate with high contrast and high display quality level have attracted a great deal of attention because they make it possible to reduce the electricity consumption, width, and weight.

The reflection-type liquid crystal displays with no back light can display the information with the light coming from the user such as an indoor-lighting or a sun light, and thus are required to be enhanced in brightness. In recent years, there have been developed various techniques in order to solve the problems, for which instance, the loss of light is restrained by decreasing the number of polarizers, the number of which normally used is two, to one, the incident light is focused by providing microscopic structures on the reflector surface, a mirror reflector is combined with a diffuser film, and a reflection hologram with a focusing function is used.

However, the methods of reducing the number of polarizers and using the mirror reflector in combination with the diffuser film can enhance the brightness to some extent but are not sufficient, while the methods of providing microscopic structures on the reflector surface and using the reflection hologram have problems in increased production cost and decreased productivity, compared with cases using the conventional reflectors.

BRIEF SUMMARY OF THE INVENTION

An object of the present invention is to solve the foregoing problems. The present invention was achieved based on the finding that the use of a cholesteric liquid crystal film with specific optical parameters can easily produce a reflection-type liquid crystal display device with a high visibility at low cost.

According to a first aspect of the present invention, there is provided a reflection-type liquid crystal display device comprising a liquid crystal cell where a liquid crystal layer is provided between two opposed electrode substrates, a reflecting layer, and a cholesteric liquid crystal film wherein the ratio (SCE/SCI) of the specular component excluded-reflectance (SCE) to the specular component included-reflectance (SCI) of the cholesteric liquid crystal film is 15% or more, the wavelength bandwidth of the cholesteric selective reflection ranges from 30 nm to 150 nm, and the center wavelength of the cholesteric selective reflection is in the visible range of 380 to 780 nm or in the near-infrared range of 800 to 2000 nm.

According to a second aspect of the present invention, there is provided the reflection-type liquid crystal display device according to the first aspect of the invention wherein the cholesteric liquid crystal film is so orientated that the helical axes are not homogeneously parallel with each other in the direction of the thickness.

According to a third aspect of the present invention, there is provided the reflection-type liquid crystal display device according to the first aspect of the invention wherein the cholesteric liquid crystal film has on a part thereof a region exhibiting a diffractivity.

According to a forth aspect of the present invention, there is provided the reflection-type liquid crystal display device according to the third aspect of the invention wherein the cholesteric liquid crystal film has an orientation in which the helical axes are not homogeneously parallel with each other in the direction of the thickness and the helical pitch lengths are not homogeneously equal in the direction of the thickness.

According to a fifth aspect of the present invention, there is provided the reflection-type liquid crystal display device according to the first through forth aspects of the invention further comprising one or more polarizers.

According to a sixth aspect of the present invention, there is provided the reflection-type liquid crystal display device according to the first through fifth aspects of the invention further comprising one or more optical compensation layers.

DETAILED DESCRIPTION OF THE INVENTION

The reflection-type liquid crystal display device of the present invention comprises a liquid crystal cell where a liquid crystal layer is formed between two opposing electric substrates, a reflection layer, and a specific cholesteric liquid crystal film.

No particular limitation is imposed on the electric substrate as long as the purpose of the invention can be achieved. There may be used known electric substrates for controlling a liquid crystal material exhibiting a liquid crystallinity when it displays.

The liquid crystal layer may be formed by filling and disposing a material exhibiting a liquid crystallinity between the electric substrates. No particular limitation is imposed on the material exhibiting liquid crystallinity. There may be used various monomeric liquid crystals and polymeric liquid crystals which have usually been used as liquid crystal materials constituting various liquid crystal cells, and mixtures thereof. Dyes and chiral agents may be added to the material.

Other than the above-described electric substrates and the material exhibiting a liquid crystallinity, the liquid crystal cell may contain various components which are required to make the cell work in various modes of liquid crystal cell described hereinafter.

No particular limitation is imposed on the mode of a liquid crystal cell. For example, there may be exemplified GH (Guest Host) mode, TN (Twisted Nematic) mode, STN (Super Twisted Nematic) mode, ECB (Electrically Controlled Birefringence) mode, IPS (In-Plane Switching) mode, VA (Vertical Alignment) mode, OCB (Optically Compensated Birefringence) mode, HAN (Hybrid Aligned Nematic) mode, halftone gray scale mode, domain dividing mode, and display modes using a ferrodielectric liquid crystal and an antiferrodielectric liquid crystal.

No particular limitation is imposed on the mode of driving the liquid crystal cell. Therefore, it may be simple matrix mode used in STN-LCD, active matrix mode using active electrodes such as TFT (Thin Film Transistor) electrodes, MIM (Metal Insulator Metal) electrodes and TFD (Thin Film Diode) electrodes, and plasma address mode.

No particular limitation is imposed on the reflection layer arranged in the reflection-type liquid crystal display device as long as it has a sufficiently high reflectivity. For example, the reflection layer may be a metal such as aluminum, silver, gold, chromium, and platinum, an oxide such as magnesium oxide, a laminate of films of dielectrics, a liquid crystal film exhibiting a selective reflectivity, and combinations thereof. These reflection layers may be flat or curved and may have a function as the electrode on the electrode substrate located on the side opposite to the viewing side. The reflection layer may not be only ones which do not transmit but reflect light but also semi-transmissive ones which transmit part of light.

No particular limitation is imposed on the location of the reflection layer in the reflection-type liquid crystal display device as long as it is arranged on the side opposite to the viewing side of the liquid crystal layer.

The cholesteric liquid crystal film of the reflection-type liquid crystal display device of the present invention is characterized in that the diffusivity defined by the ratio ((SCE/SCI)) of the specular component excluded-reflectance (SCE) to the specular component included-reflectance (SCI) is 15 percent or more, and the center wavelength of the cholesteric selective reflection is in the visible range of 380 to 780 nm or in the near-infrared range of 800 to 2000 nm.

The term "SCI" denotes a total reflectance derived when a diffusive light is uniformly illuminated to the object. The term "SCE" denotes a diffusive reflectance obtained by excluding the specular reflection light components (the light components diffusing at the surface of the object) from the total reflectance. That is, there is a relationship of "total reflectance=specular reflectance+diffusive reflectance". The specular component excluded-reflectance and specular component included-reflectance can be measured in accordance with "Methods of color measurement-reflecting and transmitting objects" prescribed in JIS-Z-8722 by means of a measuring apparatus, for example a spectral colorimeter having an illumination/receptor optic system wherein d/8 (diffused illumination 8°) is received, such as CM-3500d manufactured by Minolta Co., Ltd.

The cholesteric liquid crystal film is 15 percent or more, preferably 20 percent or more and 90 percent or less, and particularly preferably 30 percent or more and 85 percent or less, in the ratio of "SCE" to "SCI".

The cholesteric liquid crystal film is within the range of 30 to 150 nm in wavelength bandwidth of the cholesteric selective reflection. The term "wavelength bandwidth of the cholesteric selective reflection" denotes a wavelength range in which the reflectance by selective reflection is 70 percent or more upon incidence of a circularly polarized light in the same direction as the twist direction of the liquid crystal molecules which form the cholesteric orientation.

The center wavelength of the cholesteric selective reflection of the cholesteric liquid crystal film is in the visible range of 380 to 780 nm, and preferably 420 to 700 nm or in the near-infrared range of 800 to 2000 nm, and preferably 850 to 1100 nm.

It is desired that the number of twist turns in the cholesteric orientation is 2 or more, preferably 2.2 or more, and particularly preferably 2.5 or more.

The cholesteric liquid crystal films having specific optical parameters used in the present invention are those in which the cholesteric orientation is so fixed that the helical axes of the cholesteric liquid crystal phase are not homogeneously parallel with each other in the direction of the film thickness.

As an example of such a cholesteric orientation, there is mentioned one wherein when a helical axis structure in an ordinary cholesteric orientation is regarded as a pseudo-layer structure, the layer structure is oriented in a regularly or irregularly curved or bent state. Such a state is generally referred to as "fingerprint-like structure". When such a fingerprint-like structure is formed, oily streaks are observed on the cholesteric liquid crystal surface. One example of the cholesteric liquid crystal film may be those having the fingerprint-like structure and forming oily streaks but are not limited thereto.

The region where a cholesteric orientation is so formed that the helical axes are not homogeneously parallel with each other in the thickness direction may be formed on the entire region, surface or interior of the film. For example, the cholesteric liquid crystal film may have the region on a part of the film surface and in a part of the film interior. A plurality of such regions may be formed in the single layered film, for example, on the front and back surfaces or in a plurality of film interior regions. It is not always necessary that the region be formed into a layer having a uniform thickness on the film surface or in the film interior. Therefore, it is sufficient that the region is formed on at least partially of the film surfaces or in the film interiors. The region may be formed into a desired shape, such as diagram, pictograph, numeral numbers, and symbols. The presence of the above-described cholesteric orientation in the cholesteric liquid crystal film can be easily confirmed by observing the surface profile and the cross-sectional profile of the liquid crystal phase under an atomic force microscope or a transmission electron microscope.

The cholesteric liquid crystal film having a desired diffusivity can be obtained by forming a polymeric liquid crystal material, a monomeric liquid crystal material, or a mixture thereof into a film such that a cholesteric orientation having the fingerprint-like structure and forming the oily streaks is formed and then by cooling and fixing the orientation by a method selected depending on the film material, such as cross-linking. The conditions where the cholesteric orientation having a desired diffusivity can be formed depends on the kind, composition and physical properties of the polymeric liquid crystal material and the monomeric liquid crystal material and thus can not be determined with certainty. However, the cholesteric liquid crystal film for the present invention can be obtained by suitably adjusting the heat processing temperature and time upon formation of the cholesteric orientation and the film thickness. The heat processing temperature is in the range of generally 30 to 250° C., preferably 40 to 200° C., and particularly preferably 50 to 170° C. The heat processing time is in the range of generally 5 seconds to 2 hours, preferably 10 seconds to 1 hour, and particularly preferably 20 seconds to 30 minutes. The film thickness is in the range of generally 0.3 to 30 µm, preferably 0.5 to 20 µm, and particularly preferably 0.7 to 10 µm. Suitable selection of these conditions results in the cholesteric liquid crystal film having various optical parameters for the present invention. When a polymeric liquid crystal is used as the main component of the film material, the cholesteric orientation is fixed by developing the desired cholesteric phase and then rapidly cooling the phase as it is. When a monomeric liquid crystal is used as the main component of the film material, the cholesteric orientation is fixed by developing the desired cholesteric phase and then cross-linking the phase with light, heat or electron beam while keeping the state.

Another example of the cholesteric liquid crystal film having specific optical parameters are those having on a part thereof a region exhibiting a diffractivity. The term "region exhibiting a diffractivity" used herein denotes a region generating such an effect that the light passed through the region is reflected from the region is diffracted into the portion geometrically corresponding to a shadow. The presence or absence of the region exhibiting a diffractivity can be confirmed by observing whether there is present or not present the light emitted at a certain angle (high-order light) other than the light linearly transmitted therethrough or reflected therefrom (zero-order light) when, for example, laser light, or the like is made incident upon the region. Alternatively, whether the region exhibiting a diffractivity is formed or not can be confirmed by observing the surface profile and the cross-sectional profile of the liquid crystal layer under an atomic force microscope, a transmission electron microscope, or the like.

No particular limitation is imposed on such a cholesteric liquid crystal film as long as it has the cholesteric orientation fixed and a region exhibiting a diffractivity on at least part of the film. Therefore, the film may be formed from a polymeric liquid crystal, a monomeric liquid crystal, or the mixture thereof. The region exhibiting a diffractivity may be formed either in the film surface and/or interior; for example, it may be formed on a part of the film surface (film surface region) or in a part of the film interior (a film interior region). The region exhibiting a diffractivity can also be formed in a plurality of regions of the liquid crystal film, for example, on the front and back surfaces of the film or in a plurality of film interior regions, respectively. The region exhibiting a diffractivity is not necessarily required to be formed into a layer having a uniform thickness on the film surface or interior. The film may only have the region on or in at least a part of the film surface or interior. When the film has a plurality of regions each exhibiting a diffractivity, all the regions are not required to exhibit the mutually same diffractivity, and each region may exhibit a mutually different diffractivity. The orientation state of the region exhibiting a diffractivity desirably forms a cholesteric orientation wherein the helical axes are not homogeneously parallel with each other in the direction of the film thickness, and the helical pitch lengths are not homogeneously equal in the direction of the film thickness. Whereas, in the regions other than those exhibiting a diffractivity, there is desirably formed the same orientation state as the conventional cholesteric orientation, wherein the helical axes are homogeneously parallel with each other in the direction of the film thickness, and the helical pitch lengths are homogeneously equal in the direction of the film thickness. The terms "film surface" and "film interior" used herein denote portions exposed to the outside and a portion other than the portion exposed to the outside, respectively.

A cholesteric liquid crystal film having a region exhibiting a diffractivity on at least part of the surface thereof, preferably on the entire surface is suitable for the present invention from the viewpoint of the methods of producing the film and imparting a diffractivity thereto. In the case where the region exhibiting a diffractivity is present on either one film surface region, the front and back surface of the film, i.e., the film surface having a region exhibiting a diffractivity and the film surface opposite thereto exhibit somewhat mutually different optical effects. Therefore, the location of the film with respect to the reflection-type liquid crystal display device of the present invention can be appropriately selected according to the use thereof and the objective functions. Furthermore, when the region exhibiting a diffractivity is formed into a layer, the thickness thereof is generally 70 percent or less, preferably 50 percent or less, and more preferably 30 percent or less, based on the thickness of the cholesteric liquid crystal film. The thickness of greater than 70 percent would fail to obtain the effects to be achieved by the present invention.

The cholesteric liquid crystal film having a region exhibiting a diffractivity on a part thereof may be obtained by a method in which a cholesteric liquid crystal film wherein the cholesteric orientation is fixed is prepared beforehand using a polymeric liquid crystal, a monomeric liquid crystal, or the mixture thereof, and then the cholesteric liquid crystal film is laminated over a diffraction element substrate by applying heat and/or pressure thereto such that the diffraction pattern of the substrate is transferred to the cholesteric liquid crystal film, or alternatively a method in which a polymeric liquid crystal, a monomeric liquid crystal, or the mixture thereof is cholesterically oriented using a diffraction element substrate as an alignment substrate, and then fixed while maintaining the cholesteric orientation.

The materials for the diffraction element substrate for use in transferring the diffraction pattern may be any materials such as metals and resins. Alternatively, any materials such as those obtained by imparting a diffraction function to the film surface, or those obtained by transferring a thin film having a diffraction function onto the film are acceptable as long as they have the diffraction pattern. Especially, films or film laminates having a diffraction function are more desirable in terms of the ease of handling thereof and the manufacturability thereof.

The term "diffraction element" used herein includes every diffraction element generating diffracted light, such as a plate of a plane hologram as its definition. The type of the diffraction element may be of the type of a diffraction element derived from the surface profile, a so-called film thickness modulation hologram, or of the type of a phase element which is not based on the surface profile, or whereby the surface profile is converted into a refractive index profile, a so-called refractive index modulation hologram. In the present invention, the film thickness modulation hologram type is more preferably used from the viewpoint of being capable of imparting the diffraction pattern information of the diffraction element to the liquid crystal more easily. Even for the refractive index modulation type, it can be preferably used in the present invention so long as it has a roughness for generating a diffraction in the surface profile.

The diffraction pattern may be transferred to the film using a commonly used heat roller, laminator, hot stump, electrothermal plate, or thermal head under pressuring/heating conditions. The pressuring/heating conditions depends on the physical properties of the polymeric liquid crystal and monomeric liquid crystal to be used. The pressure is selected from the range of 0.01 to 100 MPa, preferably 0.05 to 80 MPa, and the temperature is selected from the range of 30 to 400° C., preferably 40 to 300° C. according to the type of liquid crystal and substrate.

The thickness of the cholesteric liquid crystal film having on a part thereof a region exhibiting a diffractivity is in the range of generally 0.3 to 20 μm, preferably 0.5 to 10 μm, and particularly preferably 0.7 to 3 μm. The deviation of these ranges would fail to obtain the effects to be achieved by the present invention. The diffraction angle at the region exhibiting a diffractivity can be adjusted by selecting the type of diffraction element substrate transferring the diffraction pattern or adjusting the refractive index profile pitches. No particular limitation is imposed on the diffraction angle. However, it is in the range of 5° to 80°, preferably 10° to 70°, and more preferably 15° to 60°. The diffraction angle may be present uniformly in the region exhibiting a diffractivity and may be different depending on the location of the angle in the region. The grating structure in the region exhibiting a diffractivity may be of one-, two-, or three-dimensional and may be slanted with respect to the film surface. The diffraction angle and grating structure may be changed continuously or discretely.

Any suitable method may be employed for forming a cholesteric film with no region exhibiting a diffractivity. For example, when using a polymeric liquid crystal, there may be employed a method wherein the polymeric liquid crystal is disposed over an alignment substrate and then subjected to heat treatment or the like so as to develop a cholesteric liquid crystal phase, and the phase is rapidly cooled as it is so as to fix the cholesteric orientation. When using a monomeric liquid crystal, there may be employed a method wherein the monomeric liquid crystal is disposed over an alignment substrate and then subjected to heat treatment or the like so as to develop a cholesteric liquid crystal phase, and the phase is cross-linked with light, heat or electron beam while keeping the state thereby fixing the orientation. Alternatively, as already described, by using a diffraction element substrate as an alignment substrate, a cholesteric liquid crystal film wherein a region exhibiting a diffractivity is formed at the orientation stage can be obtained.

No particular limitation is imposed on the polymeric liquid crystal which can be used as a film material for the cholesteric liquid crystal film as long as the cholesteric orientation can be fixed. It may be a polymeric liquid crystal of either main chain type or side chain type. Specific examples are a main-chain type liquid crystalline polymers, such as polyester, polyamide, polycarbonate and polyester imide, and a side-chain type liquid crystalline polymer, such as polyacrylate, polymethacrylate, polymalonate and polysiloxane. Among these compounds, preferred is the liquid crystalline polyester because it is excellent in orientation properties for the formation of cholesteric orientation and is relatively easy to synthesize. Examples of the constituting units of the liquid crystalline polyester are an aromatic or aliphatic diol unit, an aromatic or aliphatic dicarboxylic acid unit and an aromatic or aliphatic hydroxycarboxylic acid unit.

Examples of the monomeric liquid crystal eligible in the present invention are those having a biphenyl, phenylbenzoate, or stilbene derivative to which a functional group such as acryloyl, vinyl, and epoxy is introduced, as a base skeleton. The monomeric liquid crystal may exhibit either lyotropic properties or thermotropic properties. Preferred are those having thermotropic properties with the objective of workability and processability.

For the purpose of enhancing the heat-resistance of the resulting film of the present invention, cross-linkers such as bisazide compounds and glycidyl methacrylate may be added to the liquid crystal film material, in such a range as not to bother the development of the cholesteric phase. The addition of such cross-linkers is effective in crosslinking the liquid crystalline molecules in a state in which the cholesteric phase is developed. Furthermore, various additives such as dichroic dye, dyes, and pigments may be added to the liquid crystal material in such an range that the effects achieved by the present invention are not hindered.

The reflection-type liquid crystal display device of the present invention has at least one cholesteric liquid crystal film with the above-described optical parameters. Alternatively, according to the purpose or optical properties to be required, the display device may be formed into a laminate of a plurality of the cholesteric liquid crystal films, or formed into a laminate of one or a plurality of the cholesteric liquid crystal films and one or a plurality of cholesteric orientation films wherein the cholesteric orientation is fixed such that the helical axes are homogeneously parallel with each other in the direction of the thickness. Further alternatively, when laminating two or more of the cholesteric liquid crystal films and two or more of the cholesteric orientation films, they may be laminated alternately.

No particular limitation is imposed on the position of the cholesteric liquid crystal film in the reflection-type liquid crystal display device. For example, the film may be arranged anywhere from the reflection layer side to the viewing side of the device such as between the reflection layer and the liquid crystal layer and/or on the viewing side thereof. More specifically, when the reflection-type liquid crystal display device has no polarizer, one or more of the films are preferably arranged on the viewing side of the liquid crystal layer and/or between the liquid crystal layer and the reflection layer. Whereas, when the reflection-type liquid crystal display device has a polarizer(s), one or more of the films are preferably arranged on the outer side of the polarizer located on the viewing side from the reflection layer and the outer side of the polarizer and/or between the liquid crystal layer and the polarization layer.

The reflection-type liquid crystal display device may contain, in addition to the above-mentioned liquid crystal cell, reflection layer and cholesteric liquid crystal film, one or more polarizers, one or more optical compensation layer, a protection layer, an anti-reflection layer, a prism sheet, a diffusion sheet, a light-guiding plate, or an adhesive or pressure-sensitive adhesive layer for attaching these components.

No particular limitation is imposed on the polarizer as long as the purpose of the invention can be achieved. Therefore, conventional polarizers used in a liquid crystal display device may be used. When the polarization layer is provided in the reflection-type liquid crystal display device, it may be arranged directly on the outer surface of the liquid crystal cell or arranged so as to be separated from the surface of the electrode substrate via the cholesteric liquid crystal film or other layer.

Eligible optical compensation layers are conventional ones such as oriented polymeric films, and ones obtained by using nematic liquid crystal materials or discotic liquid crystal materials. The oriented polymeric films can be obtained by subjecting a polymeric material to a known molding operation such as rolling, drawing, solid-extruding, blow-molding, and vacuum evaporation. The compensation layer formed with the liquid crystal material can be obtained by orienting a material containing a nematic liquid crystal material or a discotic liquid crystal material so as to assume a desired orientation state such as nematic-, twisted-nematic-, cholesteric-, hybrid-, or twisted-hybridorientation, and then fixing the orientation by the method already-described with respect to the fixation of the orientation of the cholesteric liquid crystal film.

The visibility of the reflection-type liquid crystal display device can be synergistically improved with the combination of the optical compensation layer and the cholesteric liquid crystal film wherein the helical axes are not homogeneously parallel with each other in the thickness direction.

No particular limitation is imposed on the protection layer which, therefore, may be selected from various plastic films. Various effects such as surface protection, improved strength, environmental reliability and the like can be obtained by providing the reflection-type liquid crystal display device with such a protection layer.

No particular limitation is imposed on the prism sheet, diffusion sheet and light-guiding plate. Therefore, conventional ones can be provided in the reflection-type liquid crystal display device of the present invention.

No particular limitation is imposed on the method of producing the reflection-type liquid crystal display device of the present invention. There may be used a method in which the reflection layer, the cholesteric liquid crystal film, and other layers arranged if necessary are formed on the outside of a liquid crystal cell assembled in a known manner in such an order that the desired layer structure can be obtained. No particular limitation is imposed on the method of producing each of the layers. There may be selected from various known methods properly.

Since the reflection-type liquid crystal display device of the present invention is provided with the specific cholesteric liquid crystal film, it is bright and highly visible and can be manufactured at low cost with ease.

EXAMPLES

The present invention will be described with reference to examples but is not limited thereto.

Reference Example 1

A liquid crystal polyester containing an R-form optically active compound and having a glass transition temperature of 80° C. was formed into a film by spin coating on a triacetyl cellulose film with a rubbing polyimide layer, followed by heat treatment at 135° C. for 5 minutes. The thickness of the resulting film was measured by means of a contact type film thickness meter. As a result, it was found to be 3.2 $\mu$m.

The cross section of the resulting film was observed under a polarizing microscope and a transmission electron microscope (TEM). It was confirmed that such a cholesteric orientation was formed that the helical axes were not homogeneously parallel with each other in the direction of the thickness, and a fingerprint-like structure and oily streak are formed. Furthermore, the transmission spectrum of the film was measured by means of an ultraviolet, visible, infrared spectrophotometer V-570 manufactured by Nippon Bunko Co. and found that there was formed a cholesteric liquid crystal film exhibiting a central wavelength of about 800 nm and a selective reflection with a selective reflection wavelength band width of about 130 nm, on the triacetyl cellulose film with a rubbing polyimide layer.

Furthermore, the specular competent exclude (SCE) and specular competent include (SCI) of the film were measured by means of a spectral colorimeter CM-3500d manufactured by Minolta Co., Ltd. and found to be 34.7 percent and 46.2 percent, respectively. The diffusivity (SCE/SCI) was 75.1 percent.

Example 1

The cholesteric liquid crystal film obtained in Reference Example 1 was laminated on a commercially available reflection-type liquid crystal display device such that the cholesteric liquid crystal film surface contacts the display surface of the device.

The reflection-type liquid crystal display device with the cholesteric liquid crystal film was placed under a normal lighting so as to measure the display brightness by means of a brightness calorimeter BM-5A manufactured by TOPCON CORPORATION. It was confirmed that the brightness of the device was improved by about 40 percent compared with a device which did not have the cholesteric liquid crystal film.

Example 2

A liquid crystal composition was obtained by dissolving 2 weight percent of dye for liquid crystal S-428 manufactured by MITSUI TOATSU Co in a liquid crystal material ZLI-1840 manufactured by Merck Co. The composition was injected between a pair of electrode substrates each having an ITO transparent electrode with a cell gap of 10 $\mu$m so as to form a liquid crystal layer thereby producing a liquid crystal cell. An aluminized reflection plate was laminated on the side opposite to the viewing side of the liquid crystal cell, and the cholesteric liquid crystal film obtained in Reference Example 1 was laminated on the viewing side thereby producing a GH-type liquid crystal display device.

The brightness of the resulting GH-type liquid crystal display device was measured as done in Example 1. It was confirmed that the device was drastically improved in brightness compared with a device with no cholesteric liquid crystal film.

Example 3

A liquid crystal composition was obtained by adding a chiral agent C-15 manufactured by Merck Co. to a liquid crystal material ZLI-2293 manufactured by Merck Co. so as to be in an amount of 2.7 percent by weight. The composition was injected between a pair of electrode substrates each having an ITO transparent electrode, with a cell gap of 6.2 $\mu$m so as to form a liquid crystal layer thereby producing a liquid crystal cell. A polarizer was laminated on each surface of the liquid crystal cell. A reflection plate was laminated on the polarizer opposite to the viewing side of the cell, and the cholesteric liquid crystal film obtained in Reference Example 1 was laminated on the polarizer of the viewing side thereby producing a reflection-type STN liquid crystal display device with a twisted angle of 240°.

The brightness of the resulting reflection-type STN liquid crystal display device was measured as done in Example 1. It was confirmed that the device was drastically improved in brightness compared with a device with no cholesteric liquid crystal film.

Example 4

A liquid crystal composition was obtained by adding a chiral agent C-15 manufactured by Merck Co. to a liquid crystal material ZLI-4792 manufactured by Merck Co. so as to be in an amount of 1.3 percent by weight. The composition was injected between a pair of electrode substrates each having an ITO transparent electrode with a cell gap of 4.8 $\mu$m so as to form a liquid crystal layer thereby producing a liquid crystal cell. A polarizer was laminated on each surface of the liquid crystal cell. A reflection plate was laminated on the polarizer opposite to the viewing side of the cell, and the cholesteric liquid crystal film obtained in Reference Example 1 was laminated on the polarizer of the viewing side thereby producing a reflection-type TN liquid crystal display device with a twisted angle of 90°.

The brightness of the resulting reflection-type TN liquid crystal display device was measured as done in Example 1. It was confirmed that the device was drastically improved in brightness compared with a device with no cholesteric liquid crystal film.

Example 5

A liquid crystal composition was obtained by adding a chiral agent C-15 manufactured by Merck Co. to a liquid crystal material ZLI-4792 manufactured by Merck Co. so as to be in an amount of 2.0 percent by weight. The composition was injected between a pair of electrode substrates one of which had an ITO transparent electrode and the other of which had an aluminum reflection electrode, with a cell gap of 2.2 $\mu$m so as to form a liquid crystal layer thereby producing a liquid crystal cell. Two optical compensation layers were laminated on the viewing side of the cell, i.e., on the ITO transparent electrode surface, and then a polarizer was laminated on the optical compensation layer. Further, the cholesteric liquid crystal film obtained in Reference Example 1 was laminated on the polarizer thereby producing a reflection-type TN liquid crystal display device with a twisted angle of 63°.

The brightness of the resulting reflection-type TN liquid crystal display device was measured as done in Example 1. It was confirmed that the device was drastically improved in brightness compared with a device with no cholesteric liquid crystal film.

Reference Example 2

A polycondensation reaction was conducted using 51 mmol of terephthalic acid, 21 mmol of hydroxybenzoic acid, 21 mmol of catechol, 7 mmol of (R)-2-methyl-1,4-butanediol, and 100 mg of sodium acetate under a nitrogen atmosphere while elevating a temperature stepwise, like 180° C. for 1 hour, 200° C. for 1 hour, and 250° C. for 1 hour.

The polycondensation was continued at a temperature of 250° C. for 2 hours while discharging the nitrogen and continued for another 1 hour at the same temperature under reduced pressure. The resulting polymer was dissolved in tetrachloroethane and reprecipitated with methanol thereby obtaining a liquid crystalline polyester.

A solution of the resulting polyester dissolved in N-methyl-2-pyrrolidone (20 percent by weight) was prepared and then spin-coated to a rubbed polyphenylene sulfide film. After the coating, the film was dried so as to remove the N-methyl-2-pyrrolidone thereby forming a liquid crystalline polyester film over the polyphenylene sulfide film.

The liquid crystal film was subjected to a heat-treatment at a temperature of 200 for 5 minutes and then cooled to room temperature thereby obtaining a liquid crystal polyester film on the polyphenylene sulfide film.

The transmission spectrum of the film was measured by means of an ultraviolet, visible, infrared spectrophotometer V-570 manufactured by Nippon Bunko Co. It was confirmed that there was fixed a cholesteric liquid crystal film exhibiting a selective reflection having a central wavelength of about 800 nm and a selective reflection wavelength bandwidth of about 130 nm.

Reference Example 3

Onto the surface of the cholesteric liquid crystal film obtained in Reference Example 2, was coated a commercially available photo-setting type acrylic oligomer adhesive with a thickness of 5 $\mu$m by means of a bar coater. Then, a triacetyl cellulose (TAC) film was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide film by pinching and pulling the end thereof at an angle of 180 degrees thereby obtaining a laminate of the cholesteric liquid crystal film/adhesive layer/TAC film laminated in this order.

A ruled diffraction grating film (900 lines/mm) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co. The laminate was cooled to room temperature and removed from the diffraction grating film. From the observation of the cholesteric liquid crystal film surface where the ruled diffraction grating film was superposed, it was apparently confirmed that there were the rainbow coloration caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness. An He/Ne laser beam with a wavelength of 632.8 nm was made vertically incident into the cholesteric liquid crystal film. As a result, the laser beam was observed at exit angles of 0° and about ±35°.

From the above observations, it was confirmed that there was obtained a cholesteric liquid crystal film having a region exhibiting a diffractivity on a film surface. Further, the specular competent exclude (SCE) and specular competent include (SCI) of the film was measured by means of a spectral calorimeter CM-3500d manufactured by Minolta Co., Ltd. and found to be 13.4 percent and 43.5 percent, respectively. The diffusivity (SCE/SCI) was about 30.8 percent. The following Examples were conducted using the laminate of the cholesteric liquid crystal film/adhesive layer/TAC film as a transmission-type diffraction element substrate.

Example 6

The cholesteric liquid crystal film surface of the transmission-type diffraction element substrate obtained in Reference Example 3 was laminated on a commercially available reflection-type liquid crystal display device such that the cholesteric liquid crystal film surface contacts the display surface of the device.

The reflection-type liquid crystal display device with the cholesteric liquid crystal film was placed under a normal lighting so as to measure the display brightness by means of a brightness calorimeter BM-5A manufactured by TOPCON CORPORATION. It was confirmed that the brightness of the device was improved by about 60 percent compared with a device which did not have the cholesteric liquid crystal film.

Example 7

A liquid crystal composition was obtained by dissolving 2 weight percent of dye for liquid crystal S-428 manufactured by MITSUI TOATSU Co in a liquid crystal material ZLI-1840 manufactured by Merck Co. The composition was injected between a pair of electrode substrates each having an ITO transparent electrode with a cell gap of 10 μm so as to form a liquid crystal layer thereby producing a liquid crystal cell. An aluminized reflection plate was laminated on the side opposite to the viewing side of the liquid crystal cell, and the transmission-type diffraction element substrate obtained in Reference Example 3 was laminated on the viewing side of the liquid crystal cell such that the cholesteric liquid crystal film side contacted the viewing side thereby producing a GH-type liquid crystal display device.

The brightness of the resulting GH-type liquid crystal display device was measured as done in Example 6. It was confirmed that the device was drastically improved in brightness compared with a device with no cholesteric liquid crystal film.

Example 8

A liquid crystal composition was obtained by adding a chiral agent C-15 manufactured by Merck Co. to a liquid crystal material ZLI-2293 manufactured by Merck Co. so as to be in an amount of 2.7 percent by weight. The composition was injected between a pair of electrode substrates each having an ITO transparent electrode, with a cell gap of 6.2 μm so as to form a liquid crystal layer thereby producing a liquid crystal cell. A polarizer was laminated on each surface of the liquid crystal cell. A reflection plate was laminated on the polarizer opposite to the viewing side of the cell, and the transmission-type diffraction element substrate obtained in Reference Example 3 was laminated on the polarizer of the viewing side such that the cholesteric liquid crystal surface contacted the viewing side thereby producing a reflection-type STN liquid crystal display device with a twisted angle of 240°.

The brightness of the resulting reflection-type STN liquid crystal display device was measured as done in Example 6. It was confirmed that the device was drastically improved in brightness compared with a device with no cholesteric liquid crystal film.

Example 9

A liquid crystal composition was obtained by adding a chiral agent C-15 manufactured by Merck Co. to a liquid crystal material ZLI-4792 manufactured by Merck Co. so as to be in an amount of 1.3 percent by weight. The composition was injected between a pair of electrode substrates each having an ITO transparent electrode, with a cell gap of 4.8 μm so as to form a liquid crystal layer thereby producing a liquid crystal cell. A polarizer was laminated on each surface of the liquid crystal cell. A reflection plate was laminated on the polarizer opposite to the viewing side of the cell, and the transmission-type diffraction element substrate obtained in Reference Example 3 was laminated on the polarizer of the viewing side such that the cholesteric liquid crystal surface contacted the viewing side thereby producing a reflection-type TN liquid crystal display device with a twisted angle of 90°.

The brightness of the resulting reflection-type STN liquid crystal display device was measured as done in Example 6. It was confirmed that the device was drastically improved in brightness compared with a device with no cholesteric liquid crystal film.

Example 10

A liquid crystal composition was obtained by adding a chiral agent C-15 manufactured by Merck Co. to a liquid crystal material ZLI-4792 manufactured by Merck Co. so as to be in an amount of 2.0 percent by weight. The composition was injected between a pair of electrode substrates one of which had an ITO transparent electrode and the other of which had an aluminum reflection electrode, with a cell gap of 2.2 μm so as to form a liquid crystal layer thereby producing a liquid crystal cell. Two optical compensation layers were laminated on the viewing side of the cell, i.e., on the ITO transparent electrode surface, and then a polarizer was laminated on the optical compensation layer. Further, the transmission-type diffraction element substrate obtained in Reference Example 3 was laminated on the polarizer such that the TAC film side contacted the polarizer thereby producing a reflection-type TN liquid crystal display device with a twisted angle of 63°.

The brightness of the resulting reflection-type TN liquid crystal display device was measured as done in Example 6. It was confirmed that the device was drastically improved in brightness compared with a device with no cholesteric liquid crystal film.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A reflection-type liquid crystal device comprising at least a (liquid crystal cell where a liquid crystal layer is provided between two opposed electrode substrates, a reflection layer, and a cholesteric liquid crystal film wherein the ratio (SCE/SCI) of the specular component excluded-reflectance (SCE) to the specular component included-reflectance (SCI) of the cholesteric liquid crystal film is 15 percent or more, the wavelength bandwidth of the cholesteric selective reflection of the cholorestic liquid crystal film ranges from 30 nm to 150 nm, and the center wavelength of the cholesteric selective reflection is in the visible range of 380 nm to 780 nm or in the near-infrared range of 800 nm to 2000 urn.

2. The reflection-type liquid crystal device according to claim 1 wherein the cholesteric phase of said cholesteric liquid crystal film is so fixed that the helical axes are not homogeneously parallel with each other in the direction of the film thickness.

3. The reflection-type liquid crystal device according to claim 1 wherein said cholesteric liquid crystal film has on a part thereof a region exhibiting diffractivity.

4. The reflection-type liquid crystal device according to claim 3 wherein the cholesteric phase of said cholesteric liquid crystal film is so fixed that the helical axes are not homogeneously parallel with each other in the direction of the film thickness and the helical pitch lengths are not equal to each other in the direction of the film thickness.

5. The reflection-type liquid crystal device according to claim 1 which further comprises one or more polarizers.

6. The reflection-type liquid crystal device according to claim 1 which further comprises one or more optical compensation layers.

* * * * *